United States Patent [19]

Norville

[11] Patent Number: 5,337,524
[45] Date of Patent: Aug. 16, 1994

[54] METHODS AND APPARATUS FOR REMOVING SCRATCHES FROM PLASTIC SURFACES

[75] Inventor: William C. Norville, Park City, Utah

[73] Assignee: Clearfix Corporation, New York, N.Y.

[21] Appl. No.: 993,729

[22] Filed: Dec. 17, 1992

Related U.S. Application Data

[63] Continuation-in-part of Ser. No. 962,887, Oct. 19, 1992.

[51] Int. Cl.⁵ ............................................. B24D 15/04
[52] U.S. Cl. ......................................... 51/391; 51/394; 51/204; 15/104.94; 15/227
[58] Field of Search ................... 51/204, 391, 394; 15/104.94, 227, 244.4

[56] References Cited

U.S. PATENT DOCUMENTS

| | | | |
|---|---|---|---|
| 762,754 | 6/1904 | Perkins | 51/204 |
| 2,046,240 | 6/1936 | Bayley | 51/391 |
| 2,595,429 | 5/1952 | Trussell | 51/394 |
| 4,641,391 | 2/1987 | Debrey | 15/104.94 |
| 5,007,128 | 4/1991 | Englund | 15/230 |

*Primary Examiner*—Jack W. Lavinder
*Attorney, Agent, or Firm*—Workman, Nydegger & Jensen

[57] ABSTRACT

An applicator pad for use with a polishing composition for removing scratches or other imperfections from plastic surfaces is disclosed which is generally tubular in shape, and has a bore therethrough to receive the finger of a user. The circumference of the pad is provided with a plurality of substantially flat working surfaces. The presently preferred embodiment is about two inches long, and has a hexagonal cross-section. Other preferred embodiments have a differing number of sides. The method of the invention is directed to removal of scratches from plastic surfaces through application of a suitable polishing composition to a pad and moving the pad across scratches or other imperfections to be removed. Among materials suitable for repair using the methods and apparatus of the present invention include eyeglasses, watch crystals, gauge faces, and compact discs.

13 Claims, 5 Drawing Sheets

METHODS AND APPARATUS FOR REMOVING SCRATCHES FROM PLASTIC SURFACES

CONTINUING APPLICATION DATA

The present application is a continuation in part of U.S. patent application Ser. No. 07/962,887 entitled "Compositions and Methods for Repairing and Removing Scratches and Other Imperfections from Plastic Surfaces" filed Oct. 19, 1992, still pending which application is hereby incorporated herein by reference.

BACKGROUND OF THE INVENTION

1. Technical Field

The present invention is directed to methods and apparatus for use in removing scratches and other imperfections from plastic surfaces, and more specifically to applicator pads for use in removing scratches and other imperfections from plastic surfaces and methods for the use of such pads in connection with polishing compositions.

2. Background Information

Plastic materials have substantially replaced glass as an optically transparent covering in many applications. For example, it is quite common for plastics to be used as watch crystals, for eyeglass lenses, as windows and windshields, to protect gauges, to construct compact discs, and the like. Plastic is advantageous over glass in that it is lighter in weight, less brittle, stronger, and less subject to breakage. Yet, it is also softer than glass, making it far more subject to being scratched during normal use. Scratches can seriously diminish the optical clarity of plastics.

Plastics are also prone to hazing or surface yellowing due to weathering, which is often caused by oxidation or the influence of ultra-violet light from the sun. Such discoloration can also occur through ordinary cleaning of plastic surfaces. These effects also have an adverse impact upon the optical characteristics of plastics.

Conventional methods for restoring optical clarity to plastics have been so expensive to use that it has been common to undertake replacement rather than repair except with respect to expensive plastic components. Hence, conventional technology has been used to remove scratches from expensive plastic windows such as used in aircraft because the high cost of replacement justifies the high but lower cost of repair using existing technology for removing scratches. Yet, for lower cost items such as watch crystals, gauge faces, compact discs, eyeglasses, and the like, it has been more expensive to repair the damaged plastic by removing scratches or discolorations rather than replacing them.

SUMMARY OF THE INVENTION

It is a primary object of the present invention to provide methods and apparatus for use in removing scratches or other imperfections from plastic surfaces at relatively low cost, thereby making it practical to repair relatively low cost plastic components rather than having to replace them when damaged.

It is another object of the present invention to provide an improved pad system for use in removing scratches or other imperfections from small plastic objects such as watch crystals, eyeglasses, compact discs, and the faces of gauger, or from small areas of larger objects like windows and windshields.

It is a further object of the present invention to provide an applicator having a plurality of generally flat working faces.

It is yet a further object of the present invention to provide means for protecting a user from contacting a polishing composition used to remove scratches or other imperfections from plastic surfaces.

Additional objects and advantages of the invention are set forth hereinbelow in the detailed description, or will be appreciated by the practice of the invention.

To achieve the foregoing objects, and in accordance with the invention as embodied and broadly described herein, a pad system is provided which includes a tubular shaped pad having a bore formed therein for securing it to the finger of a user. The circumferential surface is formed of a plurality (preferably six) substantially flat working faces. Another feature of the pad system of the present invention is use of protection means, such as a sheath or tubular insert, to provide a barrier between the user's finger and polishing composition applied to the pad.

The method of the invention is directed to use of a pad such as a pad constructed in accordance with the present invention to remove scratches and other imperfections from plastic surfaces.

BRIEF DESCRIPTION OF THE DRAWINGS

In the accompanying drawings, which represent the best mode presently contemplated for carrying out the present invention.

DETAILED DESCRIPTION OF THE PREFERRED EMBODIMENTS

The present invention is directed to methods and apparatus for use in removing scratches and other imperfections from plastic surfaces, and more specifically to applicator pads for use in removing scratches and other imperfections from plastic surfaces and methods for the use of such pads in connection with polishing compositions. The methods and apparatus of the present invention are of low cost and are easy to use, making it practical to remove scratches and other imperfections from the surfaces of low cost plastic materials rather than having to replace them.

Applicator Pad Systems of the Present Invention

The major component of the pad system of the present invention is pad means for use in applying a suitable polishing composition to the surface of a plastic surface. The pad means of the present invention is generally tubular in shape and has a bore passing axially from one end of the pad means through at least a portion of the length thereof, the bore being used to secure the pad means over a finger of a user. It has also been found advantageous to provide a plurality of substantially flat faces about the circumferential surface of the pad means, each of which is capable of receiving an application of a polishing composition and then used in removing scratches or other imperfections from plastic surfaces.

Figure 1:
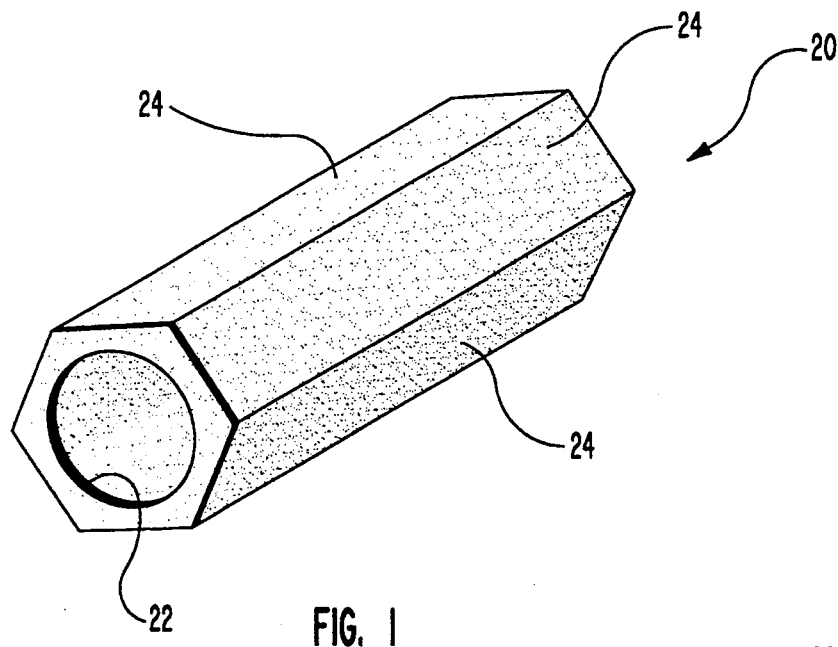
FIG. 1 is a perspective view of one presently preferred embodiment of an elongated hexagonal applicator pad for use in removing scratches and other imperfections from plastic surfaces.
Figure 2:
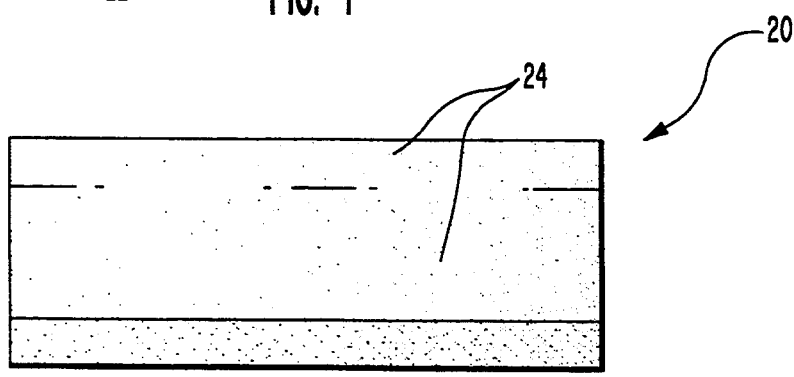
FIG. 2 is a side view of the pad illustrated in FIG. 1.
Figure 3:
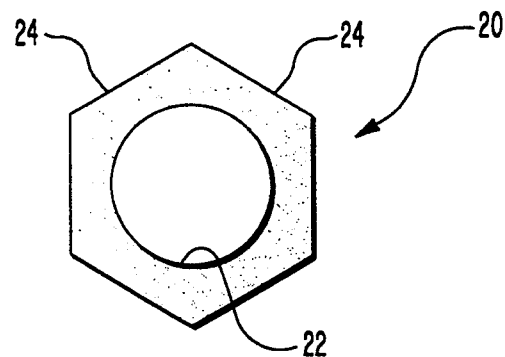
FIG. 3 is an end view of the pad of FIG. 1.

FIGS. 1–3 illustrate a presently preferred pad means which is comprised of a pad 20 which is generally hexagonal in cross-section, thereby presenting six substantially flat faces 24 around the circumference of the pad. Pad 20 is also advantageously provided with a generally cylindrical bore 22 passing through the entire length thereof. Bore 22 is preferably sized so as to fit reasonably closely about the finger of a user so that it will remain in place during use.

Although it will be appreciated that other dimensions could be used, it is presently preferred that the hexagonal pad 20 of FIGS. 1–3 have a length of about 2 inches, and the bore 22 of pad 20 have a diameter of about nine-sixteenths (9/16) of an inch. The distance from the edge of bore 22 to each of the surrounding faces 24 of the pad is preferably about one-quarter (¼) of an inch.

Hexagonal pad 20 has been found particularly useful as an applicator pad for use in repairing scratches and other imperfections from surfaces of small plastic objects such as compact discs, eyeglasses, watch crystals, gauge faces, and the like, and is also useful for repairing relatively small areas of larger objects, such as windows or windshields.

The use of a generally hexagonal pad provides a plurality of flat work faces, each having a relatively small surface area. The plurality of flat work faces is advantageous in that clean areas of pad are available during the course of a repair, or for additional repairs required at a later time.

The approximate two inch length is advantageous because it is short enough that when placed over the end of a user's finger, it will extend only to about the second knuckle, thereby permitting bending of the user's finger at that knuckle. A hexagonal pad of the dimensions set forth above also provides a flat working surface area of a size which is advantageous for many repair situations. The 9/16 inch bore size is calculated to be a reasonable diameter to accept the finger of an average user, although it will be appreciated that other sizes could also be offered.

Figure 4:
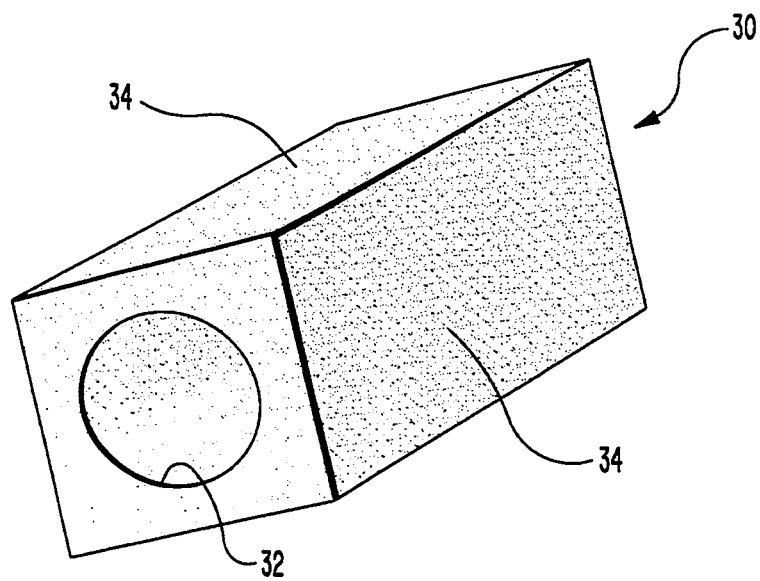
FIG. 4 is a perspective view of an elongated square applicator pad for use in removing scratches and other imperfections from plastic surfaces.
Figure 5:
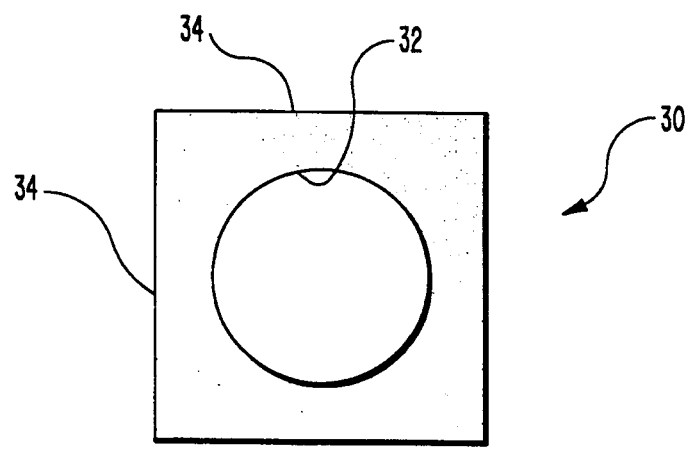
FIG. 5 is an end view of the pad of FIG. 4.
Figure 6:
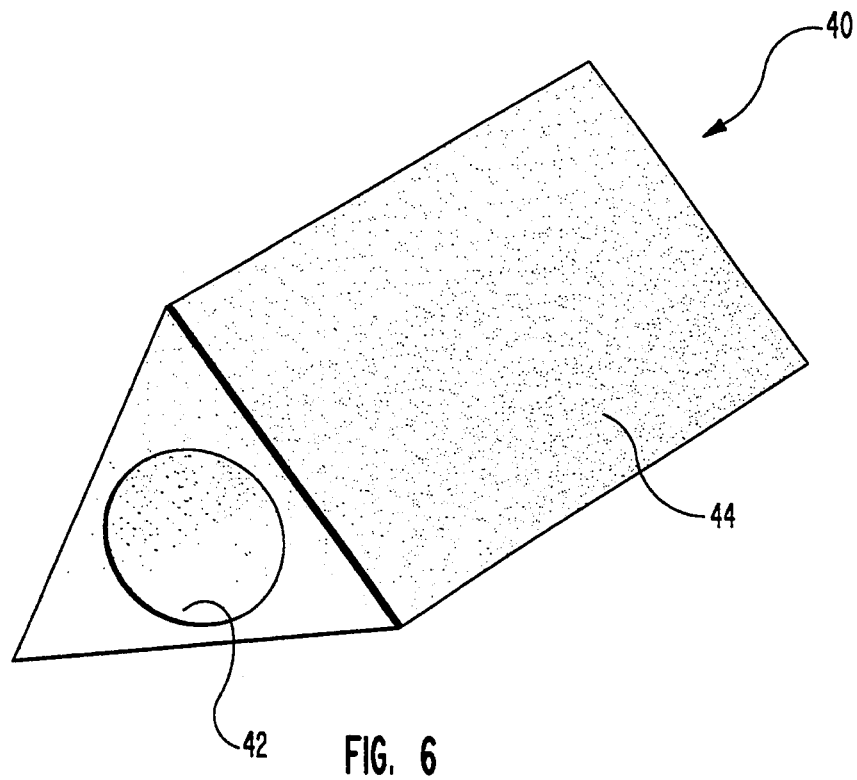
FIG. 6 is a perspective view of an elongated triangular applicator pad for removing scratches and other imperfections from plastic surfaces.
Figure 7:
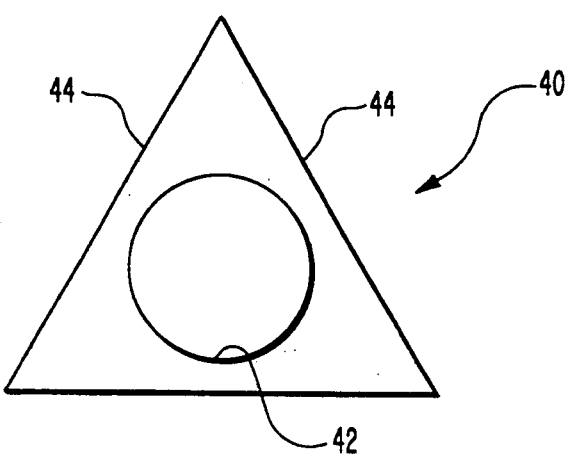
FIG. 7 is an end view of the pad of FIG. 6.

Other pad shapes are also useful. For example, by way of example and not of limitation, FIGS. 4–5 show the use of a pad 30 which is generally square in cross-section so as to provide four faces 34. Pad 30 is also provided with a bore 32 therethrough capable of accepting the finger of a user. FIGS. 6–7 show a pad 40 which is generally triangular in cross-section, having three faces 44 and also provided with a bore 42. Not shown, but also clearly possible shapes include shapes having other numbers of sides.

Figure 8:
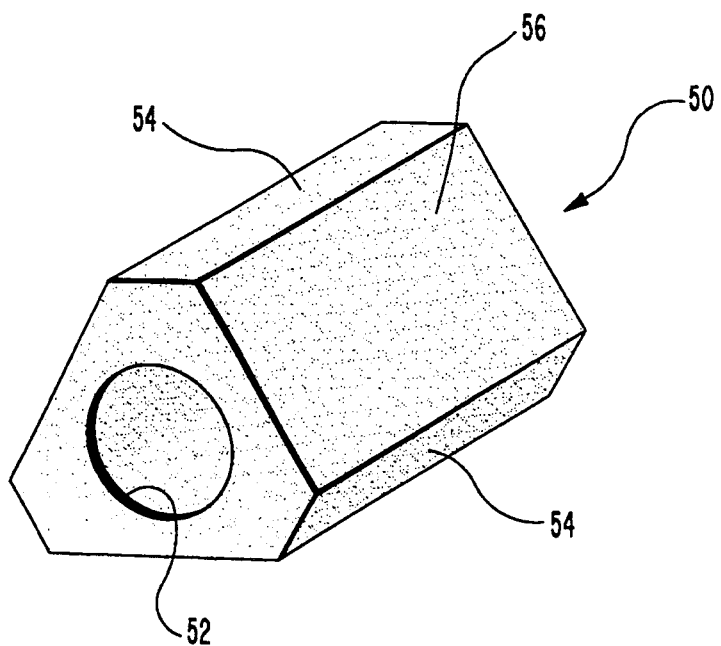
FIG. 8 is a perspective view of another six-sided applicator pad.

Also possible are pads having sides which are not of identical size (such as a trapezoidal cross-sectional shape), thereby providing a variety of different sizes of working surfaces on a single pad. FIG. 8 is a perspective view illustrating a particularly preferred six-sided pad 50 in which the sides are not identical in size. Rather, pad 50 of FIG. 8 provides three faces 54 which are narrower than another three faces 56. Pad 50 is also provided with a bore 52.

Figure 9:
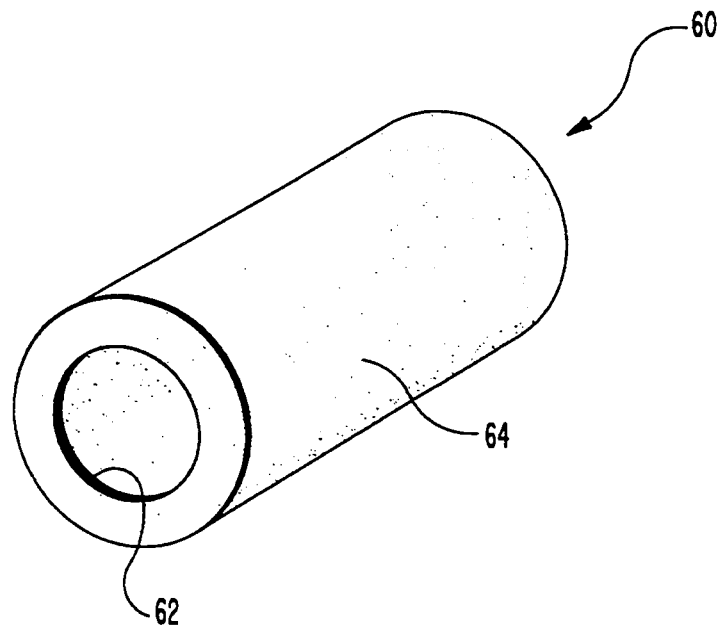
FIG. 9 is a perspective view of a generally cylindrical pad.

FIG. 9 illustrates the use of a generally cylindrical pad 64, having an exterior surface 64, which can be viewed as having an extremely large number of very narrow faces. Although less preferred than other embodiments having faces with a more substantial flat surface area, the tubular pad 64 of FIG. 9 is nevertheless useful in the practice of the invention. Pad 60 is also provided with a bore 62.

Based upon the teachings of the present invention, one of ordinary skill will be able to select a pad having suitable numbers of sides and dimensions for any particular application.

Also possible, but not illustrated, is the use of bores which do not pass through the entire length of the pad. This construction has the advantage of permitting the end of the pad to be used as an additional working surface, which may be particularly useful in tight or cramped areas, such as when repairing faces of aircraft gauges, or the like. However, it is contemplated that in many typical uses the pad will be reversed on the user's finger during use so as to expose an unused area on the same face of the pad for use; the use of a bore which extends from one end only partially through the pad would not permit such reversal of the pad on a user's finger.

It will be appreciated that pads 20, 30, 40, 50 and 60 can be constructed of a variety of materials. Presently preferred is open cell polyurethane, which works well to distribute a polishing compound used to effect the removal of scratches and other imperfections, and also provides an advantageous mechanical opposition to compression during use. The material is also readily susceptible to a simple manufacturing process involving the use of a die having a shape corresponding to the end view of the desired pad (e.g., see FIG. 3) with a block of pad material having a thickness corresponding to the desired length of the pad (e.g., 2 inches). Alternatively, a pad having the desired cross-section could be extruded and cut to the desired length.

Figure 10:
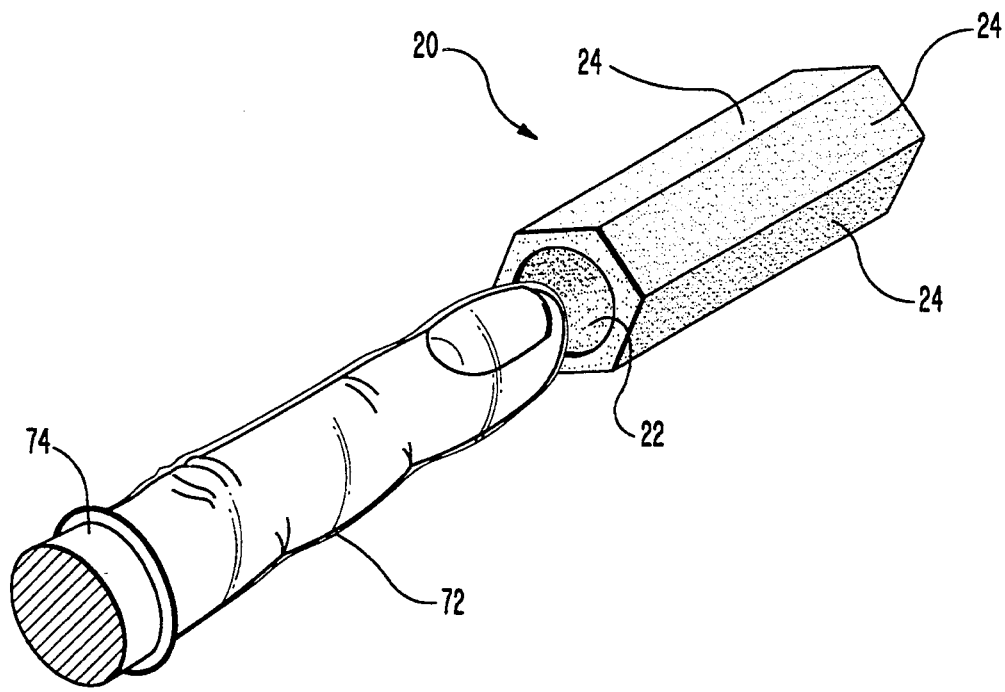
FIG. 10 is a perspective view of a user's finger fitted with a protective covering for use with a pad of the present invention in order to protect a user from coming into direct contact with the polishing composition with which such pad is used.
Figure 11:
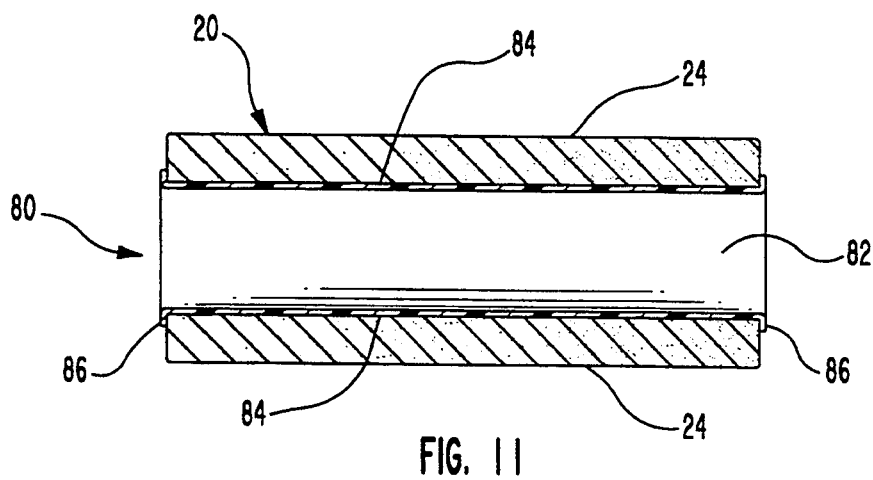
FIG. 11 is a cross-sectional view of a pad of the present invention further provided with a tubular member placed within the bore of the pad in order to provide protection to a user's finger.

It is contemplated that in some instances it will be desirable to provide protection means as part of the pad system of the present invention for protecting a user's finger from coming into contact with the polishing composition. FIGS. 10 and 11 illustrate two different approaches for accomplishing this protection within the scope of the pad system of the present invention.

FIG. 10 illustrates the use of a protective covering, such as a condom-like sheath 72, to provide a protective barrier between the finger 74 and any polishing composition which would otherwise contact it. Preferably, sheath 72 is formed from latex or polyurethane, or other suitable material capable of being rolled up like a condom for packaging and ease in placing it onto a user's finger. After positioning sheath 50 over the end of a user's finger, the covered finger is then inserted into the bore, as suggested in FIG. 10.

FIG. 11 shows an alternative protection means which is comprised of a tubular member 80 having a length and diameter substantially the same as that of the bore of a pad. Such a tubular member may be inserted within the bore of each pad during manufacture, or a single reusable tubular member may be provided together with a plurality of pads. Preferably, the outside surface 84 of tubular member 80 is in friction fit with the bore of the pad with which it is used, and the inside surface 82 is sized so as to accept the user's finger. Flanges 86 may be provided to maintain tubular member 80 in place.

Preferred Polishing Compositions

Preferred polishing compositions are disclosed in copending patent application Ser. No. 07/962,887, although it should be understood that other polishing compositions might be formulated which are also useful for the removal of scratches and other imperfections from plastic surfaces by means of the methods and apparatus of the present invention.

Presently Preferred Methods of Use

The pad system of the present invention is particularly useful in practicing the methods of the invention in order to effect the removal of scratches or other imperfections from the surface of relatively small plastic objects, such as compact discs, watch crystals, eyeglasses, and gauge faces, or relatively small areas of larger plastic objects, such as windshields and windows.

For most plastic surfaces having scratches or other imperfections capable of repair through treatment with a polishing composition, the presently preferred method of use involves obtaining an appropriate first polishing composition capable of substantial removal of the scratches or imperfections, and applying it to a clean surface of an applicator pad constructed in accordance with the present invention. The pad is next moved across the plastic surface in the region containing scratches or other imperfections in a direction generally perpendicular to the scratches. An appropriate first polishing composition is the "Thick Formula" set forth in copending patent application Ser. No. 07/962,887, although as set forth therein, other formulations would also be beneficial in many situations.

Next, a second polishing composition capable of removing fine scratches is advantageously obtained and applied to a second clean surface of the applicator pad, and then moved in a direction generally parallel to the scratches or other imperfections. The plastic surface may then be washed or simply wiped with a silicone free soft towel, such as terry cloth or soft cotton. Examples of suitable second polishing compositions include those containing polishing grits in the range of about 0.3 to about 5 microns. In some cases, it may be desirable to provide a third polishing composition for a third polishing step, or it may be advantageous to provide a plurality of polishing compositions so that specific compositions can be selected in response to the severity of the damage to be repaired.

Although the foregoing method has been found acceptable for all plastic surfaces tested, an alternative application method may prove easier or more effective when removing scratches from the optical surfaces of compact discs. Rarely do compact discs have large or deep scratches. Further, because of the optical characteristics of compact discs, it is important to prevent discontinuities which run circumferentially. Accordingly, an alternative method useful for removing scratches from compact discs involves obtaining a fine grit polishing composition, applying it to the surface of an applicator pad having a generally rectangular flat working surface, and moving the pad in a direction radially across the surface of the compact disc, such as by drawing the pad from a point near the center of the disc radially outwardly to or past the edge of the disc.

After the damaged area has been treated with the polishing compound, the disc should be wiped with a clean silicone free towel. Alternatively, the surface may be washed with an antistatic solution prior to wiping it with a silicone free towel. Preferably, the surface of the compact disc is wiped using a circumferential motion about the center of the disc.

It will be appreciated that the present invention may be embodied or practiced in other specific forms without departing from its spirit or essential characteristics. The described embodiments and methods are to be considered in all respects only as illustrative and not restrictive, and the scope of the invention is indicated by the appended claims rather than by the foregoing description. All changes which come within the meaning and range of equivalency of the claims are to be embraced within their scope.

What is claimed and desired to be secured by United States Patent is:

1. A pad system for use in removing scratches from plastic surfaces comprising, pad means for use in applying a suitable polishing composition to the surface of a plastic surface, said pad means being formed in a generally tubular shape from an open cell material which is resilient but provides mechanical opposition to compression during use;

said tubular shaped pad means including a bore running axially from one end of said pad means through at least a portion of the length of said pad means;

said bore having a diameter approximately the same diameter as the diameter of a finger of a user so a user may insert a finger into the bore in order to removably secure the pad means to a user's finger; and the circumferential surface of said generally tubular pad means being formed of a plurality of substantially flat faces, each of said faces being individually capable of receiving polishing composition and used in removing scratches or other imperfections from plastic surfaces.

2. A pad system as defined in claim 1, wherein the plurality of substantially flat faces consists of six faces.

3. A pad system as defined in claim 2, wherein each of the six faces of said pad means have substantially the same dimensions so that the tubular pad means is substantially hexagonal in cross-section.

4. A pad system as defined in claim 2, wherein the length of the pad means is about two inches.

5. A pad system as defined in claim 2, wherein the bore runs axially through the entire length of the pad means so that either end of the pad may be inserted over the user's finger.

6. A pad system as defined in claim 1, wherein the length of the pad means is about two inches.

7. A pad system as defined in claim 1, wherein the bore runs axially through the entire length of the pad means so that either end of the pad may be inserted over the user's finger.

8. A pad system as defined in claim 1, wherein said pad means is constructed of open cell polyurethane.

9. A pad system as defined in claim 1, wherein the plurality of substantially flat faces consists of four faces.

10. A pad system as defined in claim 1, wherein the plurality of substantially flat faces consists of three faces.

11. A pad system as defined in claim 1, further comprising protection means for protecting the finger of a user from contact with a polishing composition.

12. A pad system as defined in claim 11, wherein the protection means comprises a sheath which is sized to closely fit over the end of a user's finger before said finger is inserted into the bore, thereby providing a barrier between polishing composition and a user's finger.

13. A pad system as defined in claim 11, wherein the protection means comprises a tubular member having a length and diameter substantially the same as the bore.

* * * * *